United States Patent [19]

Loring

[11] Patent Number: 4,942,728
[45] Date of Patent: Jul. 24, 1990

[54] STICKLE BAR JOINT CONSTRUCTION

[75] Inventor: Maurice Loring, Rushville, Ill.

[73] Assignee: Kondex Corporation, Lomira, Wis.

[21] Appl. No.: 197,565

[22] Filed: May 23, 1988

[51] Int. Cl.⁵ .......................................... A01D 34/02
[52] U.S. Cl. ...................................... 56/296; 56/299
[58] Field of Search ................. 56/296, 297, 298, 299, 56/300, 301, 302

[56] References Cited

U.S. PATENT DOCUMENTS

| | | | |
|---|---|---|---|
| 30,595 | 11/1860 | Smith . | |
| 329,696 | 11/1885 | Barnes | 56/299 |
| 443,791 | 12/1890 | Palmer . | |
| 668,486 | 2/1901 | Brown | 56/302 |
| 888,491 | 5/1906 | Hampton . | |
| 1,340,868 | 5/1920 | Aidlotte | 56/300 |
| 3,508,388 | 4/1970 | Bachholz | 56/297 |

FOREIGN PATENT DOCUMENTS 1197266 7/1965 Fed. Rep. of Germany ........ 56/296

OTHER PUBLICATIONS

"Combine, Mower Sickle Bar Comes in Sections", Farm Show, vol. 11, No. 4, 1987, Jul.–Aug. issue.

Primary Examiner—John Weiss
Attorney, Agent, or Firm—Quarles & Brady

[57] ABSTRACT

A sickle bar is formed of upper and lower bar assemblies each including at least two bars arranged end to end. The split between the bars in the upper assembly is longitudinally offset from the split between the bars in the lower assembly. A plurality of sickle cutter sections are mounted to the bar assemblies by bolts that pass through the sickle sections and through both bar assemblies. A sickle section spans each split and the bolts for that sickle section are disposed on both sides of the split. A flat strap may overlay the exposed split in the bar assembly that is opposite to the sickle sections.

7 Claims, 1 Drawing Sheet

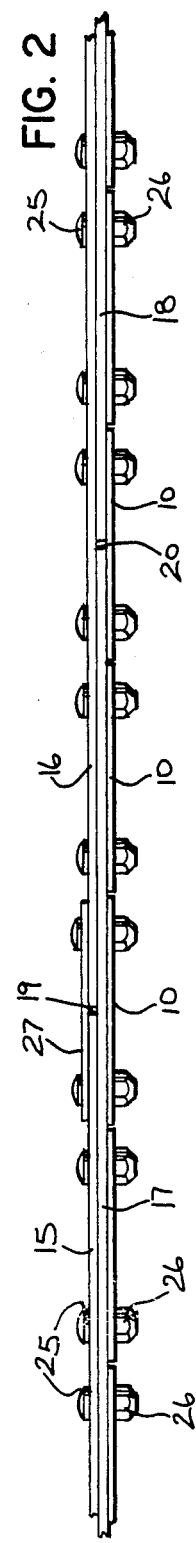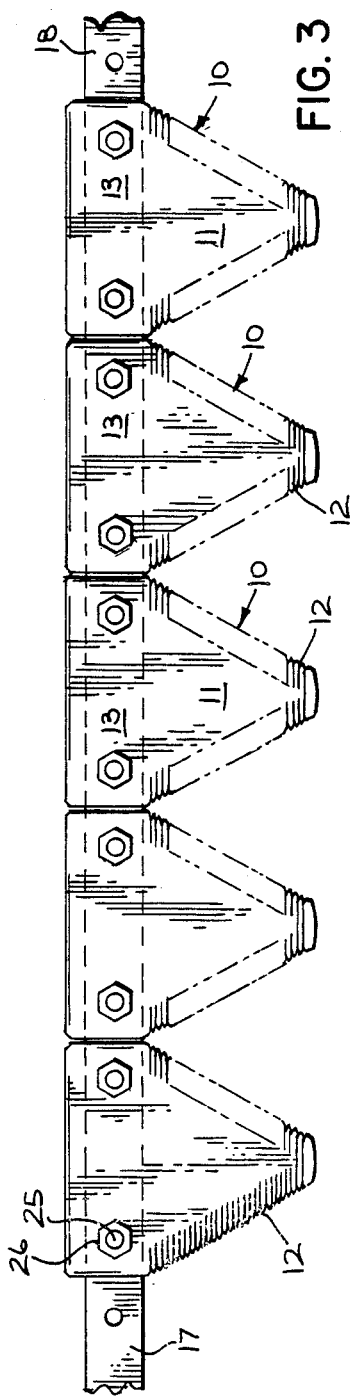

STICKLE BAR JOINT CONSTRUCTION

BACKGROUND OF THE INVENTION

This invention relates to sickles, and particularly to an improved construction for the bar that mounts the sickle cutter sections.

Sickles are widely used in mechanical apparatus for cutting and harvesting. Sickles typically contain an elongated bar to which are attached a plurality of triangular tooth sickle cutter sections arranged side by side along the length of the bar. The bar with the attached sickle sections is reciprocated relative to a guard structure and the material to be cut is caught between the reciprocating cutter sections and the guards.

The sickles, and therefore the sickle bars, can be very lengthy. A 30 foot sickle bar is not uncommon.

The sickle sections will occasionally break or become excessively worn. The sections are typically attached to the bar by some removable fasteners such as bolts, so that it is relatively simple to replace one or more sickle sections. However, when a bar breaks, or an entire length of assembled bar and sickle sections must be replaced, it is necessary to transport a very long flat bar. The cost of shipping such a part is very expensive in terms of its intrinsic value.

The present invention provides a sickle bar construction that allows a sickle to be made up of a number of shorter bar sections, without reducing the strength or endurance of the resulting sickle.

SUMMARY OF THE INVENTION

In accordance with the invention, a sickle bar for mounting a plurality of adjoining sickle sections includes top and bottom bar assemblies each of which has at least two bars arranged end to end. Each split between the ends of the bars in one of the two bar assemblies is longitudinally offset relative to each split between the ends of the bars of the other bar assembly.

As a result of the construction, the joints between the shorter lengths of bars that make up the long sickle bar are spanned by bars of the other bar assemblies thereby increasing the strength at each split. The strength of the resulting sickle may be further enhanced by so arranging the sickle sections upon the sickle bar that each split is overlapped by a sickle section.

In the preferred embodiment, the longitudinal offset between the splits in the top and bottom bar assemblies is equal to a whole multiple of the longitudinal dimension of a sickle section, preferably at least a multiple of two. The sickle sections are preferably disposed against the underside of the bottom bar assembly and connected to the two bar assemblies by removable bolts that pass through the two bar assemblies. The splits at the ends of the bars in the top bar assembly may be covered by straps which span the split and are held in place by the bolts.

A long sickle bar can be provided that is built up of sections of shorter bars arranged in top and bottom assemblies to permit ease of handling without sacrificing the strength of the resulting sickle assembly.

It is a principal object of this invention to provide an improved sickle bar made up of shorter lengths for ease in handling and shipment.

It is another object of the invention to provide an improved sickle bar in which only portions of an entire bar need be replaced in case of damage to the bar.

The foregoing and other objects and advantages of the invention will appear in the detailed description that follows. In the description, reference is made to the accompanying drawing which illustrates a preferred embodiment of the invention.

BRIEF DESCRIPTION OF THE DRAWING

FIG. 1 is a top plan view of a length of sickle made in accordance with the present invention;

FIG. 2 is a side view in elevation of the sickle of FIG. 1; and

FIG. 3 is a bottom plan view of the length of sickle.

DETAILED DESCRIPTION OF THE PREFERRED EMBODIMENT

Referring to the drawing, a sickle is formed with a plurality of identical sickle sections 10 whose forwardly projecting tooth portions 11 have serrated cutting edges 12. The rear of each sickle section 10 is shaped as an extending rectangular mounting portion 13. The sickle sections 10 are adapted to be disposed side-by-side along a sickle bar, as shown.

The sickle bar is formed of a top sickle bar assembly comprised of two or more flat bars 15 and 16, and by a lower bar assembly which also includes two or more flat bars 17 and 18. As shown in the drawings, the split 19 between the ends of the bars 15 and 16 of the top bar assembly is longitudinally offset from the split 20 between the ends of the bars 17 and 18 that comprise the bottom bar assembly. As also illustrated in the drawings, each split 19 and 20 is spanned by a sickle section 10 and the longitudinal offset between the splits 19 and 20 is equal to the longitudinal dimension of two sickle sections 10.

The sickle sections 10 are joined to the bar assemblies by a plurality of bolts 25 each receiving a nut 26. Two bolts join each sickle section 10 to the bars and the bolts are positioned towards each end of the rectangular portion 13 of a sickle section 10 so that one bolt would be disposed on either side of a split 19 or 20. The bolts not only hold the sickle sections 10 to the bars but hold the two bar assemblies together to form a continuous, structural assembly.

The split 19 in the upper assemblies may be covered by a thin strap 27 that spans the bolts 25 on either side of the split 19 and which is held in place by those bolts.

As will be apparent, the sickle can be shipped in parts and assembled in the field. Alternatively, the bars 15 and 17 with this associated sickle sections 10 could be assembled as a unit and the bars 16 and 18 with their associated sickle sections 10 could be assembled as a second unit. The two units may then be assembled in the field by abutting the bars 15 and 16 and the bars 17 and 18. The abutted bars would then be joined and joining them together by attaching the three sickle sections 10 which span the joint and also by attaching the strap 27.

Although the sickle is shown as being assembled using bolts, the upper and lower bar assemblies and the sickle sections could be joined together using rivets or other such fasteners. Removable fasteners such as bolts could be used only for the sickle sections 10 which span the joint and rivets could be used for joining the remaining sickle sections to the bars.

The bars 15, 16, 17 and 18 may be of a thickness that is half of the thickness of a typical continuous single sickle bar. The combined upper and lower assemblies would then exhibit a strength that is equal to or exceeds that of the solid single bar when assembled.

Although the length of sickle is illustrated as having only one joint defined by single, longitudinally offset splits between bars, a sickle can be formed from many short portions of bars with multiple joints.

I claim:

1. A sickle bar for mounting a plurality of adjoining sickle sections along the length of the bar, said sickle bar comprising:

top and bottom bar assemblies each including at least two bars arranged end-to-end;

each split between the ends of the bars in one of the bar assemblies being longitudinally offset relative to each split between the ends of the bars in the other bar assembly.

2. A sickle bar in accordance with claim 1 wherein the longitudinal offset between the split in the two bar assemblies is not less than the longitudinal dimension of a sickle section.

3. A sickle bar in accordance with claim 1 wherein the longitudinal offset between the splits in the two bar assemblies is equal to a whole multiple of the longitudinal dimension of a sickle section.

4. In a sickle including a sickle bar and a plurality of identical sickle sections mounted side-by-side along the length of the sickle bar, the improvement wherein:

the sickle bar is formed of top and bottom bar assemblies each including at least two flat bars arranged end-to-end;

each split between the ends of the bars in one of the bar assemblies being longitudinally offset relative to each split between the ends of the bars in the other bar assembly, and each split being spanned by a sickle section.

5. A sickle, comprising:

a sickle bar having top and bottom bar assemblies each including at least two bars arranged end-to-end, each split between the ends of the bars in one of the assemblies being longitudinally offset relative to each split between the ends of the bars in the other assembly;

a plurality of sickle sections arranged side-by-side along the sickle bar and against one of the bar assemblies, one of said sickle sections spanning each of the splits; and fasteners joining together the sickle sections and the top and bottom bar assemblies, the fasteners for each sickle section that spans a split being disposed on both sides of the split.

6. A sickle in accordance with claim 5 wherein the fasteners are removable bolts that extend through the sickle sections and bar assemblies.

7. A sickle in accordance with claim 5 together with a strap spanning each exposed split in the other bar assembly and joined to the bar assemblies by said fasteners.

* * * * *

UNITED STATES PATENT AND TRADEMARK OFFICE
CERTIFICATE OF CORRECTION

PATENT NO.   : 4,942,728
DATED        : July 24, 1990
INVENTOR(S)  : Maurice Loring It is certified that error appears in the above-identified patent and that said Letters Patent is hereby corrected as shown below:

Column 1, line 1, "STICKLE" should be ---SICKLE---.

On the cover page, the Title should be

"SICKLE BAR JOINT CONSTRUCTION"

Signed and Sealed this

Seventh Day of April, 1992

Attest:

HARRY F. MANBECK, JR.

*Attesting Officer*        *Commissioner of Patents and Trademarks*